(12) United States Patent
Divisi

(10) Patent No.: US 9,157,576 B2
(45) Date of Patent: Oct. 13, 2015

(54) LUBRICATION DEVICE WITH FLUID LUBRICANT FLOW RATE REGULATION

(71) Applicant: DROPSA S.p.A., Milan (IT)

(72) Inventor: Walter Divisi, Monaco (MC)

(73) Assignee: DROPSA S.P.A., Milan (IT)

( * ) Notice: Subject to any disclaimer, the term of this patent is extended or adjusted under 35 U.S.C. 154(b) by 191 days.

(21) Appl. No.: 13/776,241

(22) Filed: Feb. 25, 2013

(65) Prior Publication Data

US 2013/0220737 A1   Aug. 29, 2013

(30) Foreign Application Priority Data

Feb. 27, 2012   (IT) ............................... MI2012A0289

(51) Int. Cl.
| | |
|---|---|
| F16N 27/00 | (2006.01) |
| F16K 47/00 | (2006.01) |
| F16N 7/38 | (2006.01) |
| F16K 1/38 | (2006.01) |
| F16N 27/02 | (2006.01) |
| F16N 29/02 | (2006.01) |
| F16K 1/04 | (2006.01) |
| F16K 1/54 | (2006.01) |
| F16K 1/52 | (2006.01) |

(52) U.S. Cl.
CPC ... *F16N 7/38* (2013.01); *F16K 1/04* (2013.01); *F16K 1/38* (2013.01); *F16K 1/52* (2013.01); *F16K 1/54* (2013.01); *F16N 27/02* (2013.01); *F16N 29/02* (2013.01)

(58) Field of Classification Search
CPC ............. F16K 1/36; F16K 1/38; F16N 25/02; F16N 27/005; F16N 27/02
USPC ................ 184/7.4; 251/122, 206; 137/625.48
See application file for complete search history.

(56) References Cited

U.S. PATENT DOCUMENTS

| | | |
|---|---|---|
| 608,342 A * | 8/1898 | McElroy ........................ 251/122 |
| 1,001,111 A * | 8/1911 | Wood ............................ 137/244 |

(Continued)

FOREIGN PATENT DOCUMENTS

| | | |
|---|---|---|
| DE | 2123163 A1 | 12/1972 |
| DE | 3942857 C1 | 5/1991 |

(Continued)

OTHER PUBLICATIONS

U.S. Appl. No. 13/776,132 to Walter DIVISI—"Lubrication Device With Flowmeter," filed Feb. 25, 2013.

(Continued)

*Primary Examiner* — William E Dondero
*Assistant Examiner* — Minh Truong
(74) *Attorney, Agent, or Firm* — Novak Druce Connolly Bove + Quigg LLP

(57) ABSTRACT

A lubrication device including a tank of fluid lubricant to be dispensed to a user position, a component for raising the pressure of the lubricant, a device for regulating the flow rate of a pressurized lubricant, and a distributor for enabling the lubricant flow to be conveyed to the user position with regulated flow rate. The regulating device including a body provided at least with one feed channel and one outflow channel put into communication by an aperture within the interior of which a valving element is movable provided with a perimetral lateral surface in which at least one window is provided in communication with a free end of the valving element.

19 Claims, 3 Drawing Sheets

(56) References Cited

U.S. PATENT DOCUMENTS

| | | | | |
|---|---|---|---|---|
| 1,185,970 | A * | 6/1916 | Bower | 239/574 |
| 1,525,733 | A * | 2/1925 | Haskell, Jr. | 251/122 |
| 1,619,937 | A * | 3/1927 | Huff | 251/122 |
| 1,806,565 | A * | 5/1931 | Russel | 251/122 |
| 1,966,294 | A * | 7/1934 | Goslee | 137/327 |
| 2,014,314 | A * | 9/1935 | Defenbaugh | 251/122 |
| 2,521,314 | A * | 9/1950 | Therolf | 251/332 |
| 2,541,176 | A * | 2/1951 | Rockwell | 137/625.3 |
| 3,521,852 | A * | 7/1970 | Gillis, Jr. | 251/121 |
| 3,776,276 | A * | 12/1973 | Stiltner | 137/625.18 |
| 3,789,881 | A * | 2/1974 | Kozulla et al. | 137/625.48 |
| 3,791,413 | A * | 2/1974 | Muller et al. | 137/625.3 |
| 4,015,631 | A * | 4/1977 | Hayes | 137/625.33 |
| 4,356,996 | A * | 11/1982 | Linder et al. | 251/82 |
| 4,399,709 | A | 8/1983 | Diepold-Scharnitzky | |
| 4,650,155 | A * | 3/1987 | Liantonio | 251/118 |
| 5,010,767 | A | 4/1991 | Divisi | |
| RE33,782 | E * | 12/1991 | Fujita et al. | 251/129.11 |
| 5,163,476 | A * | 11/1992 | Wessman | 137/625.3 |
| 6,293,514 | B1 * | 9/2001 | Pechoux et al. | 251/122 |
| 6,796,264 | B1 | 9/2004 | Appenzeller et al. | |
| 6,807,984 | B2 * | 10/2004 | Volovets et al. | 137/625.3 |
| 6,973,941 | B2 * | 12/2005 | Baumann | 137/625.37 |
| 7,757,711 | B2 * | 7/2010 | Hama | 137/601.19 |
| 7,832,425 | B2 * | 11/2010 | Wears et al. | 137/625.33 |
| 8,356,617 | B2 * | 1/2013 | Labrie | 137/1 |
| 8,574,045 | B2 * | 11/2013 | Warner | 454/3 |
| 8,628,509 | B2 * | 1/2014 | Kropczynski et al. | 604/414 |
| 8,833,392 | B2 * | 9/2014 | Norlander et al. | 137/625.33 |
| 2003/0226406 | A1 | 12/2003 | Carlson | |
| 2007/0040136 | A1 * | 2/2007 | Caprera | 251/122 |
| 2011/0213573 | A1 | 9/2011 | Carmichael et al. | |
| 2012/0031195 | A1 | 2/2012 | Skirda et al. | |
| 2012/0031703 | A1 * | 2/2012 | Divisi | 184/6 |
| 2013/0220736 | A1 | 8/2013 | Divisi | |

FOREIGN PATENT DOCUMENTS

| | | |
|---|---|---|
| EP | 0033701 A2 | 8/1981 |
| EP | 0498242 A2 | 8/1992 |
| GB | 694888 A | 7/1953 |
| GB | 832977 A | 4/1960 |

OTHER PUBLICATIONS

Search Report of Oct. 8, 2012 for Italian Patent Application No. MI 2012A 000289 filed Feb. 27, 2012.

Office Action of Mar. 3, 2015 from U.S. Appl. No. 13/776,132 to DROPSA S.p.A.

* cited by examiner

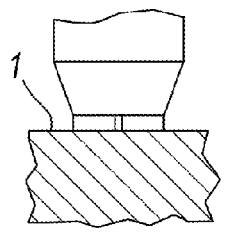 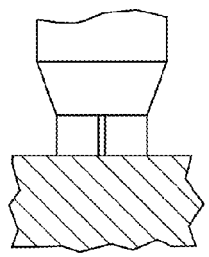 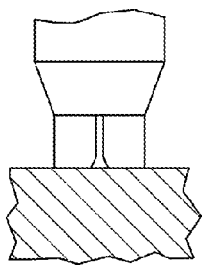 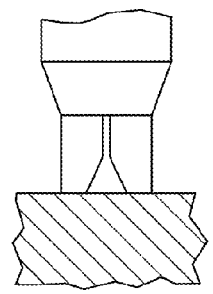
Fig. 7A    Fig. 7B    Fig. 7C    Fig. 7D
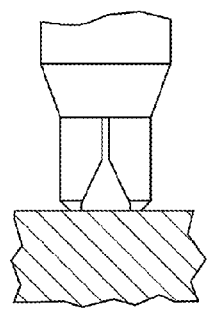 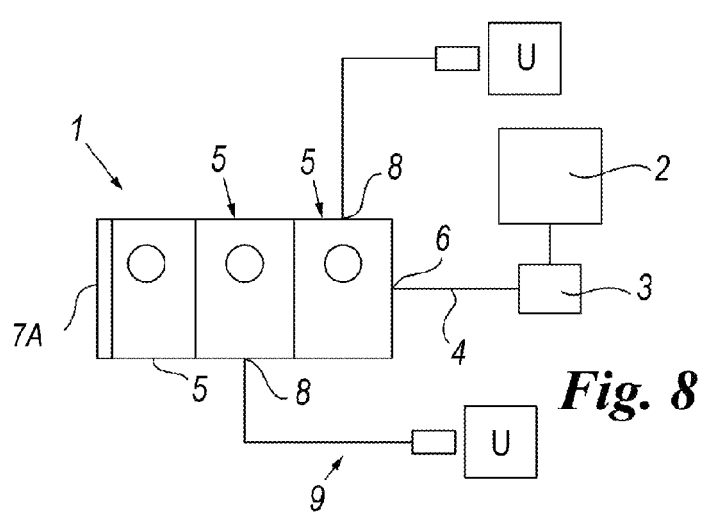
Fig. 7E          Fig. 8
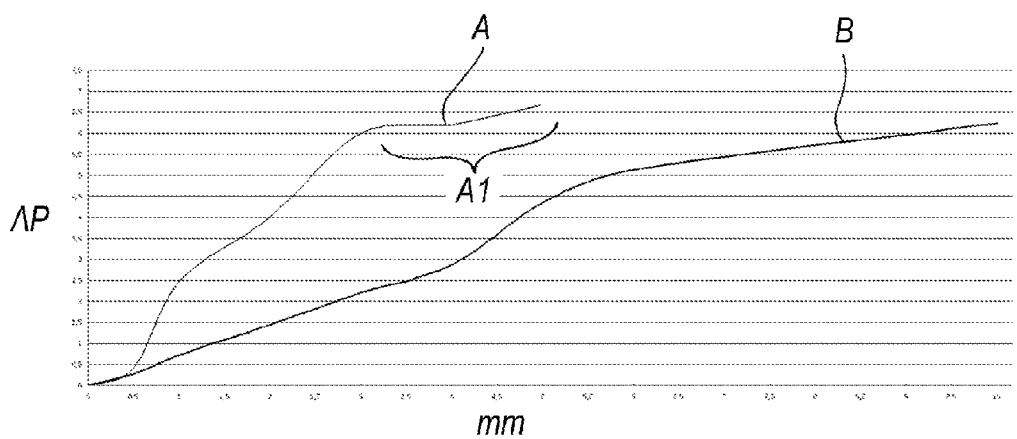
Fig. 10

LUBRICATION DEVICE WITH FLUID LUBRICANT FLOW RATE REGULATION

CROSS-REFERENCE TO RELATED APPLICATIONS

This claims the priority of Italian Patent Application No. MI2012A000289 filed on 27 Feb. 2012, incorporated herein by reference.

The invention relates to a lubrication device with regulation of the fluid lubricant flow rate.

Known lubrication devices comprise a lubricant tank and means for pressurizing the lubricant contained in the tank in order to feed it to user points requiring lubrication. For example, such user points can be bearings on paper production machines or forging presses subjected to considerable loads and heat.

It is well known that the flow rate of the fluid reaching the utilization zone must be regulated and controlled to prevent lubricant wastage or insufficient lubrication due to a deficiency of dispensed fluid.

Modular regulator devices are used for this purpose.

Modular flow regulators are positioned downstream of the pressure raising means. Essentially, by positioning flow regulators side by side, a main channel is formed in which the lubricant is present under pressure, each module drawing from the common channel to feed the fluid to a utilization position, with a different flow rate. This solution is described for example in EP0498242A2 in the name of the same Applicant.

Each module also enables regulation and possible control of the lubricant flow rate.

In this respect, a feed channel is present in each module, communicating with the main channel. An outflow channel is also present, connected to suitable means for controlling the flow or for distributing the lubricant.

The feed channel is connected to the outflow channel by a sized aperture in which a needle valving element is movable.

The aperture is of circular cross-section, whereas the valving element is of conical shape with a circular cross-section (needle-like). It can move axially to the aperture such that between the surface of the valving element and the surface of the aperture an annular passage cross-section is created, the area of which can be regulated by axially moving the valving element.

Normally, valving elements with only slight conicity and hence very lengthy are used. By slightly extracting the valving element (usually done by a screw/nut drive) the passage area and hence the dispensed lubricant flow are slightly increased.

This known method, using "small" needle elements, functions perfectly when the flow rates to be regulated are very low.

In contrast, when fairly large flow rates are to be regulated, the needle element has to be nearly completely extracted from its seat. Hence in this case any further extraction of the needle element frees an ever decreasing passage area (because of smaller radius) and hence the regulation capacity at large flow rates is lost.

Larger needle elements able to properly regulate high flow rates can be formed, however it is virtually impossible to achieve good regulation either at high flow rates or at low flow rates.

To obviate these regulation problems two traditional flow regulators (needle type) have been tried in parallel.

If the flow rates to be regulated are large, the large regulator (coarse regulator) is operated. For small flow rates the small regulator (fine regulator) is operated.

If however very low flow rates have to be regulated, the traditional coarse regulator is nearly or completely closed and only the small-needle regulator (fine regulator) is operated.

The described system also enables a rough flow rate to be regulated with the coarse regulator, and to make "fine" variations with the needle regulator.

Although this configuration is fairly efficient, it presents the considerable drawback of having to operate two "cocks" to achieve the regulation.

Moreover the operation is very difficult and requires considerable ability to obtain an effective regulation.

A further drawback is the considerable difficulty of automating the procedure with regulation servomotors.

Given the relatively high cost of servomotors it is normally preferable to operate only on one of the two valves, by choosing to make a coarse regulation manually, and dispensing with the possibility of achieving automatic regulation over the entire range of flow rates actually allowed by the regulator.

An object of the present invention is to obviate the aforestated problems of the known art by providing a lubrication device presenting an improved capacity for lubricant flow rate regulation compared with traditional regulators over the entire range of flow rates considered.

A further object of the present invention is to enable fine automatic flow rate regulation for low flow rates and optimal regulation for high flow rates, by acting on only one control, preferably using a single servomotor.

These and other objects are attained by a lubrication device in accordance with the technical teachings of the accompanying claims.

Further characteristics and advantages of the invention will be apparent from the description of a preferred but non-exclusive embodiment of the lubrication device, illustrated by way of non-limiting example in the accompanying drawings, in which:

FIGS. 7A-7E show various positions which the valving element can assume relative to an aperture in which it is movable;

FIG. 8 is a schematic view of the device of the present invention;

FIG. 10 is a table comparing the device of the present invention with a traditional device.

Figure 1:
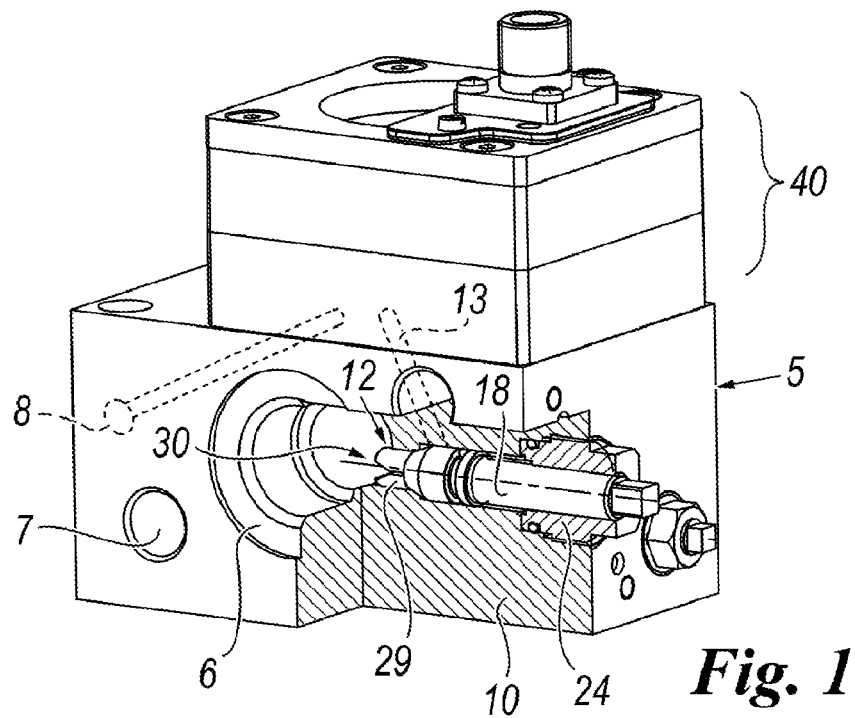
FIG. 1 is a partly sectioned perspective view of a lubricant flow regulator device to which a flow meter is also applied.
Figure 9:
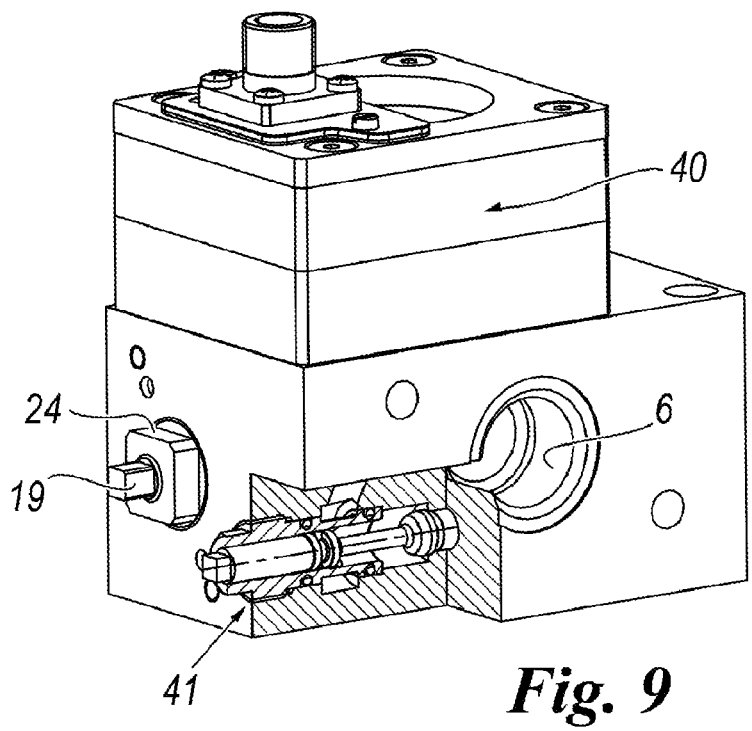
FIG. 9 is a partly sectioned perspective view of the device of FIG. 1, the section being taken through a different part of the device.
Figure 2:
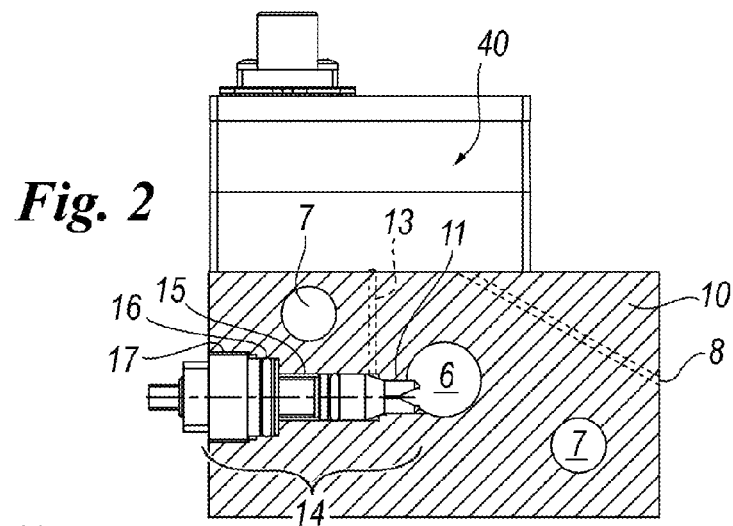
FIG. 2 is a partly sectioned lateral view of the device of FIG. 1.

With reference to said figures, these show a lubrication device indicated overall by the reference numeral 1 (FIG. 8). It comprises a tank 2 of fluid lubricant to be dispensed to a utilization position U and means for raising the pressure of said lubricant such as a pump 3. The pump can be for example of positive-displacement type and can hence draw directly from the tank, or can be of pneumatic type and hence be able to put the tank under pressure.

The pressurized lubricant, preferably oil, reaches a flow regulator device 5 via a connection 4 under pressure.

FIG. 8 shows three side-by-side modular devices blocked by a terminal plate 7a. The modules and the plate are fixed together with the aid of screws passing through holes 7.

The flow regulator device 5 is better represented in FIG. 1. FIG. 1 is a partly sectioned perspective view of a lubricant flow regulator device 5 to which a flow meter 40 is also applied.

Each regulator device 5 presents a through hole 6 forming a channel into which the lubricant originating from the pump 3 is fed. When several similar modules 5 are fixed together, the channel holes 6 are aligned to hence form a feed channel common to all the modules 5.

Additional modules can hence be positioned without having to make substantial modifications to the plant.

Each module 5 presents an outlet 8 for the lubricant, the flow rate of which is regulated by the module. This outlet is connected to distribution means 9 enabling the lubricant stream to be conveyed with regulated flow rate to the utilization position U.

The regulator device comprises a body 10 in which the already stated through hole 6 is provided. It essentially constitutes a pressurized lubricant feed channel.

Radially to the hole 6 a variable diameter first hole 14 is provided, essentially defining an aperture 12 which connects the channel 6 to a pressurized lubricant outflow channel 13.

The hole 14 presents various diameters and in particular a terminal section 11 of minimum diameter and other sections 15, 16 and 17 of increasing diameter.

The hole 14 houses a stem 18 presenting at one end a profile for connection by an operating tool (for example a spanner, a slot for a screwdriver or the like). The stem presents a threaded central part and a greater diameter head portion 21 provided with a groove for housing a sealing O-ring 23A.

The head portion 21 terminates with a valving element 23. The valving element is inserted into and movable within the aperture 12 defined by the end section 11 of the hole 14.

Essentially, the surface defining the aperture 12 (i.e. the end section of the hole 11) and the valving element have a circular cross-section, between the surface of the valving element and the surface of the hole there existing a tolerance between the hole and valving element variable between 1 and 50 micron, preferably less than or equal to 10 micron.

This tolerance is such as to enable the valving element to slide freely or with minimum interference within the aperture.

On the threaded stem an internally threaded ring nut 24 is screwed having a thread corresponding to that of the stem portion 20 and provided with a further thread for coupling to the body 10 in the interior of the hole 14.

This coupling is sealed by virtue of the presence of a further O-ring 25.

Essentially, by rotating the stem 18 with a suitable tool, the valving element 23 can be moved axially within the aperture 12 to at least partially obstruct or free said aperture, to vary a passage cross-section for said lubricant from the feed channel to the outflow channel in order to regulate its flow rate.

According to the present invention the valving element is provided with a perimetral lateral surface 29 of cylindrical shape, in which at least one window 30 is provided in communication with a free end of the valving element, or generally with the pressurized lubricant feed channel. It should be noted that in proximity to the free end the valving element surface passes from cylindrical to conical (reference 31). The usefulness of this configuration is clarified hereinafter.

In the represented example the window is substantially a diametrical notch on the valving element with a complex profile composed mainly of two sections. Essentially a first and a second identical window are disposed in a symmetrical position about the valving element axis.

Figure 4:
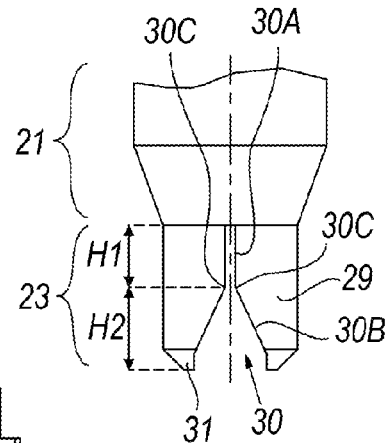
FIG. 4 is an enlargement of the circled portion of FIG. 3, in which the valving element is more visible.
Figure 3:
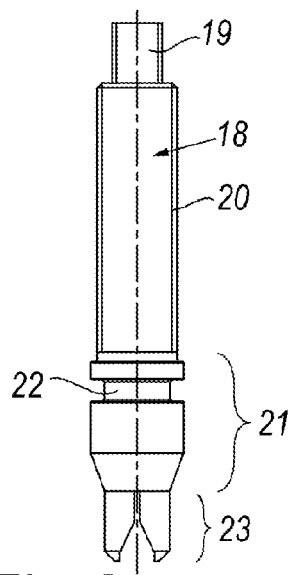
FIG. 3 is a view of a flow rate regulating stem, the end portion of which defines a valving element.
Figure 6:
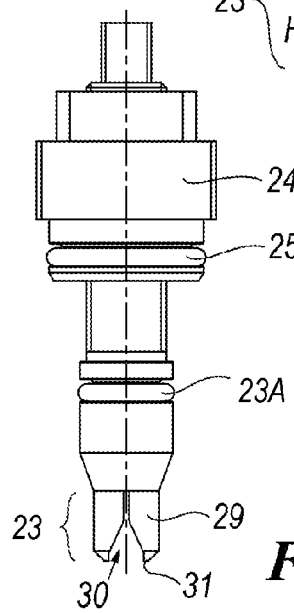
FIG. 6 is a lateral view of the stem of FIG. 3 inserted into a fixing ring nut.

In lateral view (FIG. 4) it is evident that the window 30 has an axially is extending first section 30A, more distant from the free end, of substantially constant lateral dimension, and a second section 30B adjacent and connected to the first section and diverging towards the free end.

The first section and the second section are connected by sharp edges 30C.

Figure 5:
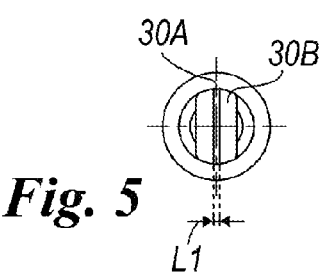
FIG. 5 is a view of the valving element of FIG. 4 from below, showing a window provided therein.

Essentially the first section is defined by a substantially parallelepiped cavity. The term substantially parallelepiped means a parallelepiped with its short sides rounded to follow the circular profile of the valving element (see FIG. 5).

In other words the first section is defined by a diametrical slot of rectangular cross-section extending mainly axially in that the width L1 is much smaller than the height H1.

The second section is instead defined by a pair of flat divergent surfaces which "cut" the circular surface of the valving element and the bevel 31 (conical outer surface) present in the end portion of this latter.

This second section is essentially a diametrical slot of substantially trapezoidal cross-section. The term substantially trapezoidal means the solid generated by two divergent planes, which intersect the cylinder of the valving element and its bevel.

As can be seen from the figures, the "minor base" of the trapezium coincides with and has the same dimensions L1 as the base of the parallelepiped slot which defines the first section.

The operation of the invention is apparent to the expert of the art from the aforegoing description and is as follows.

By acting on the stem (by unscrewing it or screwing it in) with the suitable tool, the valving element can be positioned as required for regulating the flow rate of the lubricant flowing into the outflow channel.

FIGS. 7A-7E show some of the positions which the valving element can assume relative to the level of the aperture 12. This view is evidently simplified and does not take account of the effective shape of the hole, but is very explicative and shows very well how the passage cross-section of the fluid through the window 30 varies.

In FIG. 7A it can be seen that for low flow rates the regulation is very fine, in which respect the first section 30A of the window 30 is utilized.

As the flow rates increase and hence the second section 30B is uncovered, the flow rates grow and, by utilizing the particular window shaping, the flow rate can still be optimally and proportionally regulated to essentially obtain, for each screw turn, a percentage increase in the flow rate.

It should be noted that in the last section the flow rate increase does not depend only on the increase in passage area of the window, but is also due to the passage cross-section increasing by the effect of the conicity of the end portion of the valving element.

In this condition the passage cross-section is hence that due to the shape of the lateral window, and to the annular sleeve which is uncovered as the valving element is extracted from the aperture.

This configuration applies in the case of FIG. 7E.

This differs considerably from that obtainable with a needle valve, the comparison being very evident from the graph present in FIG. 10. FIG. 10 is a table comparing the device of the present invention (curve B) with a traditional device (curve A). The graph shows the curve of opening (valving element movement in mm) against pressure difference (ΔP).

With the regulator of the present invention, a flow regulation can be obtained which varies much more regularly, and in particular the slope of the curve does not lower as in A1 (hence losing effective flow control) when flow rates become high (i.e. large valve opening).

Moreover by means of the present invention, regulation can be achieved for all flow rates by acting on a single valving element and hence for example by a single servomotor.

To complete the description it should be noted that the regulator can be coupled to a flow meter 40 to make regulation more effective. This is the configuration illustrated in FIG. 1. The flow meter 40 is of the standard type and comprises essentially on a surface thereof an inlet and an outlet for the oil the flow rate of which is to be measured.

The meter inlet and outlet are in communication respectively with the lubricant outflow channel 13 downstream of the regulating valving element and with the outlet 8 of the regulator module.

The regulator shown in FIG. 1 also presents an isolation valve 41. This isolation valve enables the flow of the channel 13 to be directly conveyed to the regulator outlet 8, such as to isolate the connection takeoffs for the flow meter and hence enable it to be easily maintained without causing the machine to shut down by removing pressure from the lubricant.

The representations of the outflow channel and of the passages existing between the regulator and the meter have been simplified in the drawings for clarity.

In this respect it is evident that because of the presence of the isolation valve, there can be no direct connection between the outflow channel 13 and the meter.

However for the expert of the art there is no difficulty in imagining how the connections are effectively made to enable proper operation of the regulator and its isolation valve.

A preferred embodiment of the invention has been described, however others can be conceived by utilizing the same inventive concept.

For example, the cross-section of the valving element has been described as circular, however it can be cylindrical with an elliptical or square or other cross-section.

Evidently in such a case the stem and the valving element will preferably be decoupled torsionally, and not be constructed in a single piece as in the previously described embodiment.

In the aforedescribed invention and in this latter variant, the cross-section through the peripheral surface of the valving element and the cross-section through the aperture are preferably geometrically similar, with a suitable tolerance.

The regulator has been shown coupled in use to a flow meter, but this flow meter is evidently not essential.

In this manner the regulator of the present invention can also be used in other lubrication systems such as in an air/oil system, in which substantially the user U is an air/oil mixing system fed with compressed air.

Finally it should be noted that the aforedescribed valving element presents a first and a second section of different geometry able to influence the flow rate.

The aforedescribed embodiment has been found to be the most economically convenient to produce with the best compromise in regulating the flow rate.

In other more complex embodiments an internal window profile can be provided which is geometrically more complex, resulting in an even more constant and regular regulation of the flow rate.

In this respect, a profile can be provided having several sections of different slope and inclination, or a curve which varies continuously.

The invention claimed is:

1. A lubrication device comprising
a tank of fluid lubricant to be dispensed to a user position,
means for raising the pressure of said lubricant,
a regulating device for regulating flow rate of a pressurized lubricant, and distribution means enabling the lubricant flow to be conveyed to said user position with regulated flow rate,
the regulating device comprising a body provided at least with one lubricant feed channel and one lubricant outflow channel,
the feed channel and the outflow channel being put into communication by an aperture, wherein within an interior of the aperture a valving element is movable to at least partially obstruct or free said aperture to vary a passage cross-section of a passageway for said lubricant from the lubricant feed channel to the lubricant outflow channel to regulate flow rate of said lubricant, the valving element cooperating with drive means for regulating axial position of the valving element relative to the aperture,
the valving element comprising opposed first and second ends, the first end being a free end proximal to the aperture, the second end being distal to the aperture,
wherein said valving element is provided with a perimetral lateral surface in which at least one window is provided in communication with the free end of the valving element, the window defining the passageway for said lubricant from the lubricant feed channel to the lubricant outflow channel, wherein the passageway passes within the valving element,
wherein said window presents, in lateral view, an axially extending first section distal from the free end, and a second section proximal to the free end, a back end of the second section being adjacent to the first section to be in communication with the first section, the second section comprises an axially extending diametrical slot which diverges from the back end of the second section towards the free end,
wherein the first section is defined by an axially extending diametrical slot and presents in lateral view a substantially constant lateral overall size,
wherein the first section of the window and the second section of the window extend radially through the entire diameter of the valving element and the window extends along the whole length of the valving element, and
the free end defines an opening having a greater lateral cross-section than any lateral cross-section of said first section,
wherein the aperture has a lateral dimension sufficient to not laterally obstruct the free end and a portion of the valving element in proximity to the free end, wherein an outer surface of the valving element presents in proximity to the free end a conical portion.

2. The device as claimed in claim 1, wherein a cross-section through the perimetral lateral surface of the valving element and of the surface defining said aperture are cylindrical.

3. The device as claimed in claim 2, wherein a cross-section through a perimetral surface of the valving element and a cross-section through the aperture are geometrically similar, the valving element presenting a tolerance to slide freely or with minimum interference within the aperture.

4. The device as claimed in claim 3, wherein the cross-section through the peripheral surface of the valving element and the cross-section through the aperture are circular.

5. The device as claimed in claim 1, comprising a flow regulating stem, said stem having a first end portion distal to the aperture and a second end portion proximal to the aperture, the drive means is at the first end portion of the stem and the second end portion of the stem defines the valving element.

6. The device as claimed in claim 5, wherein the first section and the second section are connected via a sharp edge.

7. The device as claimed in claim 5, wherein the first section is defined by a cavity of substantially parallelepiped shape, the second section being defined by a pair of flat divergent surfaces.

8. The device as claimed in claim 1, wherein the perimetral lateral surface of the valving element presents a first and second window which are identical and disposed in a position symmetrical about an axis of the valving element.

9. The device as claimed in claim 1, wherein the first section is defined by the axially extending diametrical slot of rectangular cross-section, the second section being a diametrical slot of substantially trapezoidal cross-section to define a trapezium.

10. The device as claimed in claim 9, wherein:
a minor base of the trapezium of the second section slot coincides with and has the same dimensions as the base of the parallelepiped slot of rectangular cross-section which defines the first section, and/or
the outer surface of the valving element presents in proximity to the free end a conical portion.

11. The device as claimed in claim 9, wherein a minor base of the trapezium of the window second section slot coincides with and has the same dimensions as a base of the parallelepiped slot of rectangular cross-section which defines the window first section.

12. The device as claimed in claim 1, wherein the entire free end of the valving element unobstructedly axially faces the feed channel.

13. The device as claimed in claim 1, wherein the aperture lateral dimension is an aperture diameter sufficient to not laterally obstruct the free end and the portion of the valving element in proximity to the free end.

14. The device as claimed in claim 1, wherein the portion of the valving element in proximity to the free end is cylindrical and has a diameter, and wherein the aperture lateral dimension is an aperture diameter sufficiently larger than the diameter of the portion of the valving element in proximity to the free end to not laterally obstruct the free end and the portion of the valving element in proximity to the free end.

15. The device as claimed in claim 1, wherein a cross-section through a peripheral surface of the valving element and a cross-section through the aperture are geometrically similar, the valving element presenting a tolerance to slide freely or with minimum interference within the aperture.

16. The device as claimed in claim 1, wherein the first section has a first end relatively proximal to the free end and an opposed second end relatively distal to the free end, wherein the window from the first end of the first section relatively proximal to the free end, through the second section, to the free end does not converge towards the free end.

17. The device as claimed in claim 1, wherein said window presents, in lateral view, the axially extending first section distal from the free end having substantially constant lateral overall size, and the second section, which diverges towards the free end, is adjacent to the free end.

18. The device as claimed in claim 1, wherein a portion of the window second section which diverges ends at another portion of the window second section adjacent to the free end opening having opposed parallel sidewalls.

19. The device as claimed in claim 1, wherein the cross-section through the perimetral surface of the valving element and the cross-section through the aperture are circular.

* * * * *